June 7, 1960 D. C. MacDONALD ET AL 2,939,757
RECORDER AND COMBINATION THEREOF WITH A RUBBER MILL
Filed March 10, 1955 4 Sheets-Sheet 4
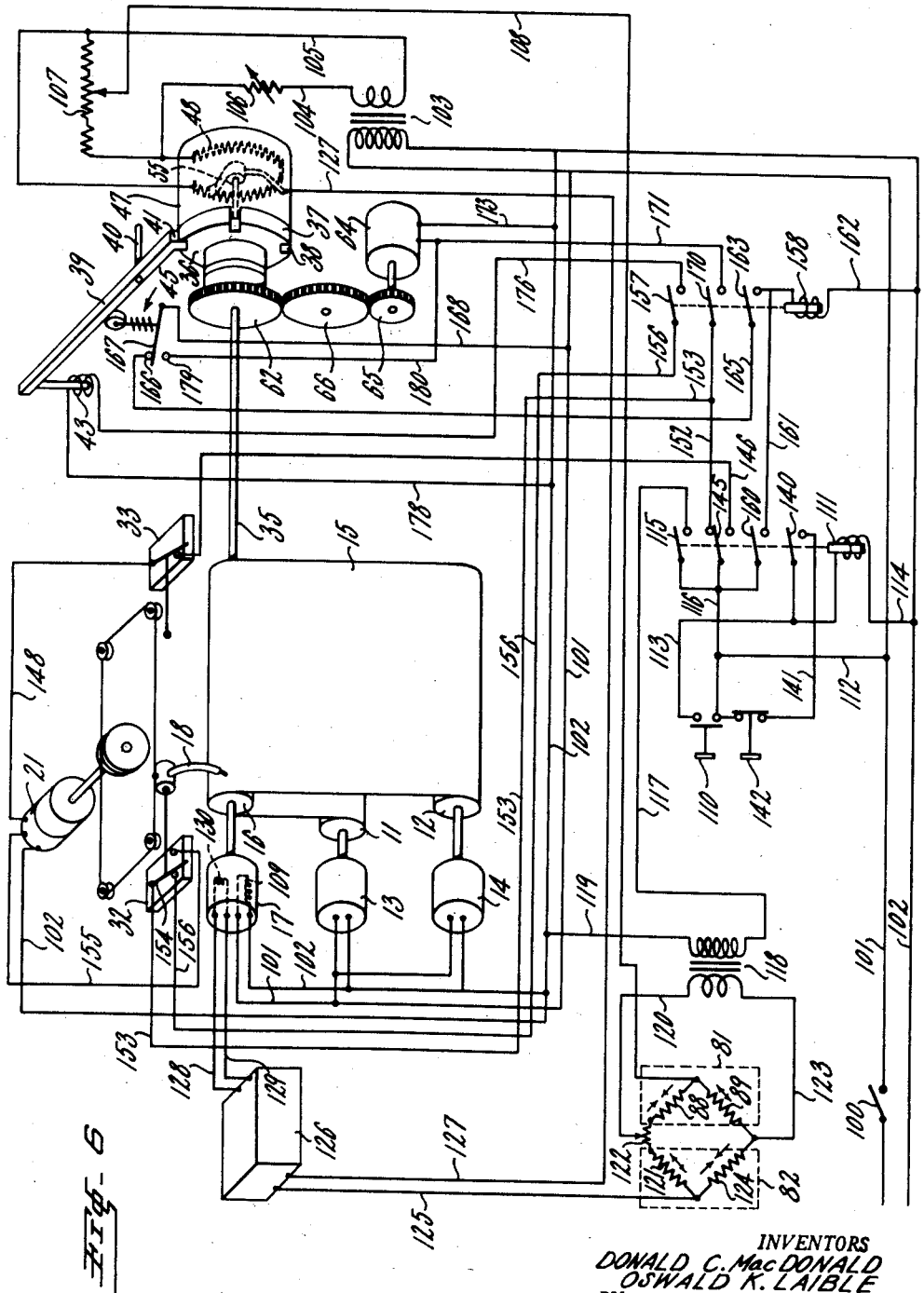
INVENTORS
DONALD C. MacDONALD
OSWALD K. LAIBLE
BY
AGENT

United States Patent Office 2,939,757
Patented June 7, 1960

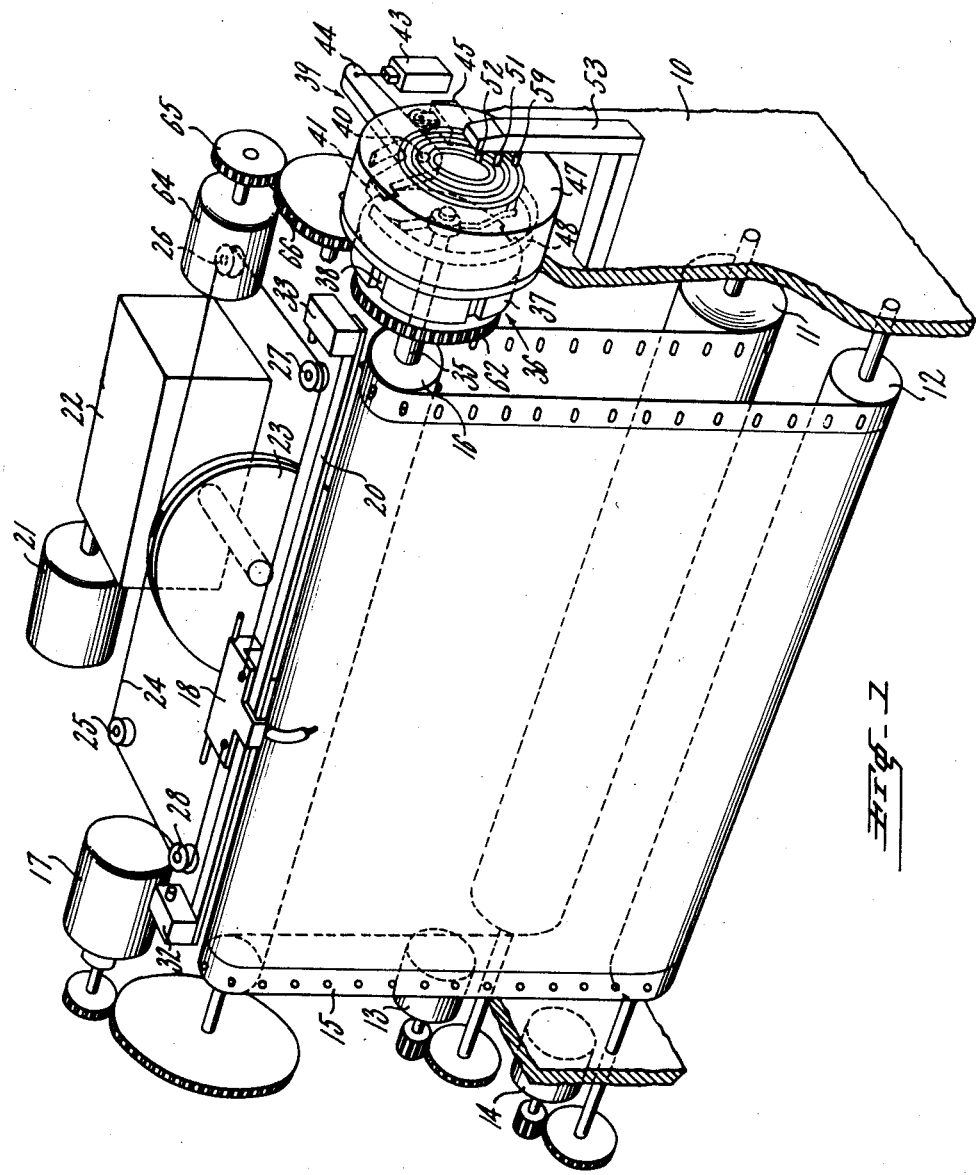

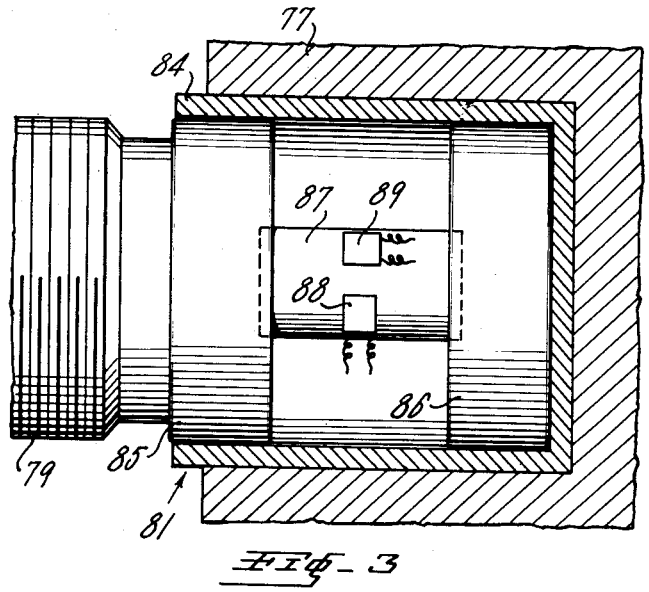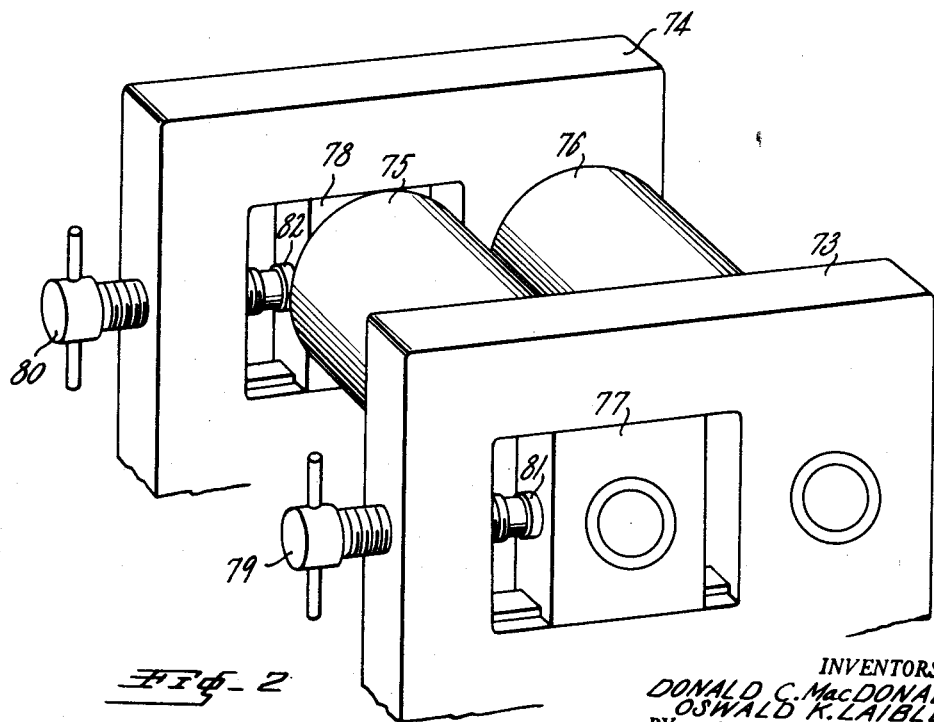

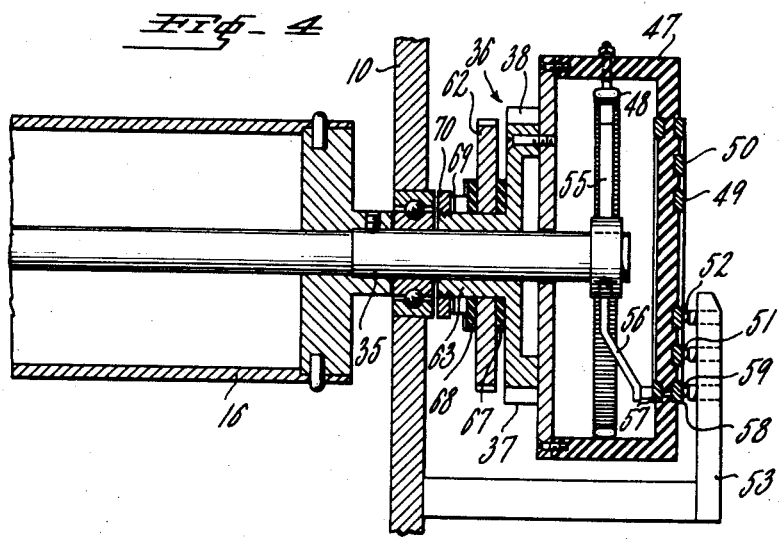
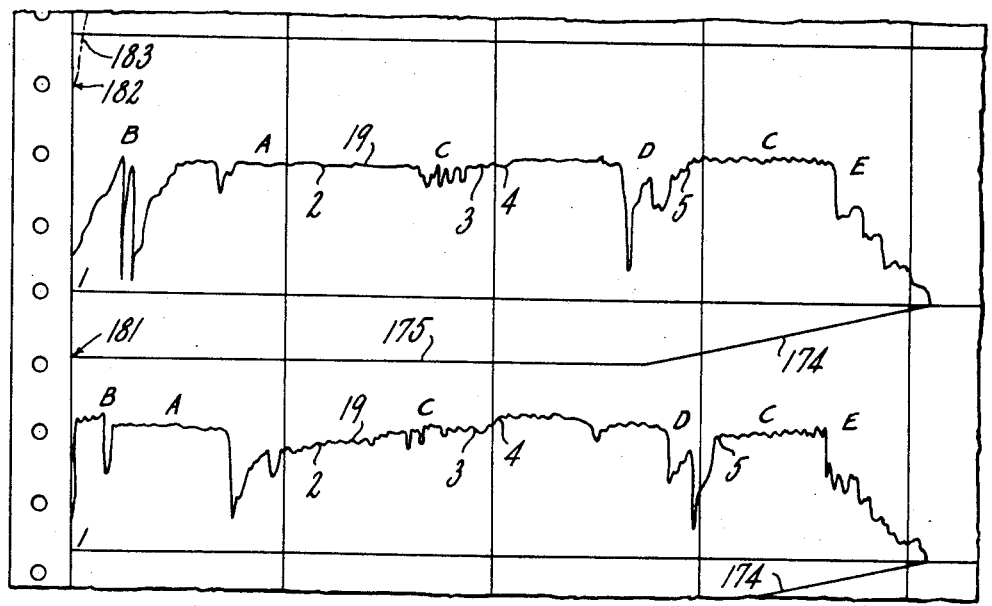

2,939,757

RECORDER AND COMBINATION THEREOF WITH A RUBBER MILL

Donald C. MacDonald, Ridgewood, and Oswald K. Laible, Wyckoff, N.J., assignors to United States Rubber Company, New York, N.Y., a corporation of New Jersey Filed Mar. 10, 1955, Serial No. 493,338

9 Claims. (Cl. 346—25)

This invention relates to a recording instrument, and more particularly it relates to an instrument for recording a continuous variation in a process variable, as well as to a rubber mill in combination with such an instrument.

The invention will be described in detail with reference to the accompanying drawing representing one embodiment of the invention, wherein:

Fig. 1 is a largely diagrammatic perspective view with parts broken away of a recording device of the invention;

Fig. 2 is a perspective view of a two-roll rubber mill with which the recorder of Fig. 1 may be associated;

Fig. 3 is an enlarged fragmentary sectional view of a portion of the rubber mill of Fig. 2 showing the mounting of electrical strain gauges to which the recorder of Fig. 1 is connected;

Fig. 4 is an enlarged fragmentary sectional view of a portion of the recorder of Fig. 1;

Fig. 5 is an enlarged portion of a chart used in the recorder, illustrating typical records made on the chart; and, Fig. 6 is an electrical wiring diagram illustrating an electrical circuit suitable for use with the recorder.

The invention contemplates the provision of a recording instrument in which the relative magnitude of a process variable is recorded continuously as a trace or other suitable marking on the surface of a chart across which a stylus or equivalent marking device is translated synchronously that is, at a constant speed, means being provided for converting a change in the process variable into a proportionate relative displacement of the chart or stylus with respect to each other. In this way the trace provides a continuous visual history of variations in the magnitude of the process variable, usually indicated by longitudinal displacements of the trace on the chart, as a function of elapsed time which is ordinarily represented by transverse distances on the chart.

In another aspect of the invention provision is also made for periodic advancement of the chart, usually in a longitudinal direction, by a predetermined amount sufficient to separate successive records or traces. In a preferred practice of the invention such periodic longitudinal advancement of the chart is associated with a transverse return of the recording stylus or pen to a common marginal origin representing zero time or the start of a given record. Typically the initiation of a given recording operation is effected automatically in conjunction with the start of a process during which it is desired to record the process variable in question, while the termination of such recording operation is effected automatically at the conclusion of the process, whereupon the chart is advanced longitudinally and the pen is returned transversely to the origin, ready for the commencement of a similar record on a fresh portion of the chart when the process in question is repeated. Such automatic periodic starting and stopping of the recording operation in accordance with the initiation and completion of the process may be accomplished by interconnecting means for starting and stopping the record, such as will be described in detail subsequently, with any appropriate means, such as a switch, motor circuit, valve, lever, etc., that changes its disposition manually or automatically in a predetermined manner at the commencement and conclusion of the particular process in question.

A preferred feature of the invention contemplates disposition of individual records of each of an indefinite series of repeated batch processes in such an arrangement as to permit ready comparison of any one process with any other process of the series, for the purpose of observing conformity or lack of conformity of the individual processes with each other or with any predetermined or desired standard. This arrangement of record may also be employed advantageously for the purpose of establishing in the first instance an appropriate standard for a given batch process, by comparing individual records with the actual results of the corresponding batches, from the standpoint of quality of the product of the batch, or economy of the batch, etc. The records for successive processes are typically in such form as to allow direct comparison of elapsed time consumed in each batch as well as direct comparison of the relative magnitude of the process variable, in addition to its rate of change or lack of change, at any corresponding instant in each batch, or over any selected corresponding period in each batch.

In one embodiment of the invention provision is made for following a process involving working a plastic material such as rubber on a milling device such as a roll mill or calender. To this end means are provided for measuring during the plastic working operation a variable that is proportionate to the condition of the plastic at any given instant. It has been found that a particularly suitable variable to measure and record for the purpose at hand is the separating force existing between the plastic working members, e.g., the mill rolls. Thus, when there is no batch of plastic such as rubber on the mill rolls, the rolls merely rotate freely and there is no force tending to separate the rolls from each other. When a batch of rubber is dumped on the mill and the rubber is forced by the action of the rolls into the small gap or nip existing between the rolls, the rubber exerts a wedging action on the rolls, tending to cause them to separate. This separating force is transmitted to the mill roll supporting members where it produces a measurable strain proportional to the separating force. The separating force on the rolls of the mill is influenced by several variables, the principal one being the rubber compound itself. It has been found that the force is constantly changing as the physical and chemical characteristics of the rubber compound are altered, by the addition and dispersion of chemicals during the mixing cycle. It has also been determined that the separating forces and consequent strains vary in a characteristic manner as the rubber batch is cut and blended on the mill by the operator in accordance with conventional practice.

It will be understood that in conventional practice rubber is milled on such roll mills for the purpose of incorporating chemicals such as vulcanizing agents, pigments, softeners and other compounding ingredients uniformly in the rubber. The milling action is also sometimes utilized to "break down" the rubber to a desired extent, that is, to reduce the viscosity of the rubber and produce other desirable changes by exerting intense shearing forces on it, with the postulated result of actually breaking the rubber molecules themselves into smaller fragments. The batch or supply of rubber stock acted upon by the mill rolls is referred to as a "bank" and in ordinary operations the rubber after being forced through the nip will adhere to one of the mill rolls—usually to the front roll which is rotated at a slower rate than the rear roll to aid in establishing this action— thereby forming a band which travels around with the front roll and returns the stock to the bank. The banded stock repeatedly intermingles more or less with the stock in the bank, and a portion of the bank is continually withdrawn through the roll nip to form additional band, and in this way the stock is continually worked and mixed and circulated on the mill.

In the course of the milling operation the operator of the mill assists the mixing action by "cutting and blending" as referred to, that is, the operator cuts the band of stock adhering to the front mill roll and folds over such cut portion to blend it more effectively with other portions of the batch. The efficacy of a mixing operation conducted for a given length of time is frequently largely dependent upon the operator's skill and diligence in cutting and blending at specified stages.

On occasion there may also be a tendency for the rubber batch to become excessively tacky, and to stick to the rear mill roll, sometimes to the detriment of facile further blending of the mix. Characteristic changes in the strain values have also been found to accompany such sticking of the stock.

When the rubber batch is finally discharged by sheeting it off from the mill in accordance with conventional practice, the separating force and strain again return to zero.

A plot of the variation of separating forces or strains on the mill rolls with time therefore affords a graphic indication of the foregoing significant happenings on the mill, and it has been found possible to discern from such a record the time at which various major compounding ingredients were added to the rubber batch, as well as the time of occurrence and the duration of cutting and blending operations by the operator, or the incidence of excessive sticking, in addition to the over-all elapsed time consumed by the milling operation. Hence, the record of mill roll separating forces affords a valuable tool for quality control in the mixing and processing of rubber stocks, enabling one to determine objectively and accurately how closely factory practice conforms to a desirable standard in any given batch, and also yielding other useful information.

Referring to the drawing, and in particular to Fig. 1, a device particularly adapted to batch recording of the foregoing kind comprises a case or supporting frame 10 in which are rotatably supported, toward the rear and front lower portions of the recorder, a chart supply roll 11 and a chart take-up roll 12, on each of which a slight counter-clockwise (as viewed in Fig. 1) torque is exerted when the recorder is in operation, by means of respective motors 13 and 14, geared to the rolls in such manner as to maintain in a taut condition a suitable chart 15 mounted in the recorder. The torque exerted on these rolls by their respective motors is insufficient to interfere with balancing and advancing movements of the chart by means to be described in detail subsequently. The chart is ruled longitudinally (vertically as viewed in the drawing) to represent time intervals, while transverse rulings (horizontal in the drawing) represent values of separating forces deposited thereon in a manner to be described.

In the upper portion of the recorder a portion of the chart intermediate of the supply and take-up rolls passes around a balancing roll 16 that is adapted to be displaced angularly by means of a servo- or balancing motor 17 that is geared thereto and that is actuated in response to changes in the variable quantity being recorded, in a manner to be described in detail below.

A pen element 18 for producing a line 19 (Fig. 5) on the chart in accordance with changes in the variable being measured is slidably supported on a guide bar 20 extending axially above the balancing roll 16 and transversely of the chart in the upper portion of the recorder. The pen is driven synchronously across the chart from the starting margin (left-hand edge of the chart as viewed in the drawing) toward the opposite margin by means of a reversible pen driving motor 21, through the agency of a gear box 22 and a vertical driving drum 23 attached thereto toward the upper rear of the recorder. A cable 24 wrapped around the pen driving drum 23 passes around horizontal guide pulleys 25, 26 toward the rear of the recorder and thence forwardly to front horizontal guide pulleys 27, 28, from whence the cable passes transversely and is secured at its ends to the pen assembly, the arrangement being such that rotary motion of the pen driving drum in an appropriate direction causes the pen to be translated to the left or to the right across the chart. The gear box 22 is preferably such that the reverse or return speed (i.e., from right to left) is rapid in comparison to the forward or recording speed. In this way, on completion of the record for a given batch, the pen may be returned quickly, in a manner to be described in detail below, and may be ready for starting the record of the next subsequent batch without delay. The gear box may if desired be constructed as disclosed in copending application Serial No. 642,155, filed February 25, 1957, now Patent No. 2,903,901, issued Sept. 15, 1959, which is a continuation-in-part of application Serial No. 453,017 of D. C. MacDonald, filed August 30, 1954, now abandoned.

At the extremes of its travel the pen assembly is adapted to contact limit switches 32, 33 mounted on the left (starting) and right hand ends, respectively, of the guide bar 20. The function of these limit switches will be explained below in connection with the description of the electrical circuit.

An arrangement of parts having to do with periodic advancement of the chart will now be described. The chart balancing roll 16 has fixed therein an axial or central shaft 35 which extends rotatably toward its right hand end through the framework 10 of the recorder, as best seen in Fig. 4. At the outside of the framework a circular cam 36 is slidably mounted on the shaft 35 in such manner that the cam is rotatable with respect to the shaft. The outer peripheral face 37 of the cam is provided with four equally spaced recesses or notches 38 disposed 90° apart around the circumference of the cam. A cam follower or pawl 39 (Fig. 1) to the rear of the cam is mounted by a pivotal attachment 40 to the framework in such manner that a forward end 41 of the pawl normally falls into one of the cam slots 38, thereby restraining the cam and parts secured thereto from rotating. At a certain time in the operation of the device a solenoid 43 attached below the rear end 44 of the cam follower or pawl 39 serves to draw such rear end downwardly, thereby tilting the forward end 41 of the pawl upwardly about the pivotal mounting 40 of the pawl so that the front end is lifted from the cam notch 38 and the cam 36 is then free to rotate. This action, and the action of a micro-switch 45 mounted below the rear arm of the pawl, will be explained more fully in connection with the operation of the electrical circuit of the device.

A potentiometer case 47 made of electrically insulating material is fixedly secured to the outer face of the cam and contains an annular slide wire resistance winding 48 (Fig. 4) that is secured to the interior periphery of the potentiometer case. Annular sliding contact rings 49, 50 on the outer surface of the potentiometer case serve to connect electrically (through wires illustrated in the wiring diagram to be described below) opposite ends of the resistance winding to exterior fixed electrical contacts 51, 52 secured to an adjacent bracket 53 supported from the framework of the recorder.

The end of the chart balancing roll shaft 35 extends into the interior of the potentiometer case 47, and a radial sliding contact arm or wiper 55, fixed at its inner end to the shaft (but electrically insulated therefrom) makes sliding contact at its radially outer end with the circumferentially extending resistance winding 48. The central portion of the wiper is electrically connected by an additional radially extending sliding contact arm 56 to a sliding contact ring 57 on the interior end wall of the potentiometer casing, whence an electrical connection leads to a third exterior contact ring 58 that is in turn contacted by a third fixed contact 59 on the supporting bracket 53. The arrangement is such that the wiper arm 55 rotates with the chart roll shaft 35 to which it is fixed, thereby varying a voltage output of the potentiometer in accordance with angular movements of the chart balancing roll shaft with respect to the potentiometer casing and the resistance winding attached therein. Similarly, any rotation of the cam and attached potentiometer case and resistance winding with respect to the shaft causes a proportionate change in the potentiometer voltage output.

For the purpose of causing the cam and potentiometer casing to rotate at a certain time between recording operations a gear 62 is slidably mounted on a reduced portion 63 of the cam, such gear being adapted to rotate with respect to the cam when the cam is held immovable by reason of engagement of the cam follower or pawl in one of the notches of the cam. The sliding gear 62 is driven at a predetermined time in the seqeunce of operations by means of a cam-advancing motor 64 (Fig. 1) coupled thereto through intermediate gears 65, 66.

An annular friction member 67 is disposed between the slideable cam-driving gear 62 and the interior face of the cam, while a second annular friction member 68 is urged against the opposite face of the slideable gear by a coil spring washer 69 that is retained in place on the reduced portion of the cam by a retaining collar 70 screwed thereon. This arrangement provides sufficient frictional engagement between the slideable cam-driving gear and the cam to cause the cam to turn with such gear when such gear is driven with the cam follower or pawl out of engagement with the cam notches. When the pawl engages a cam notch, rotation of the cam and potentiometer case ceases, while the slideable gear simply slips with respect to the friction members and with respect to the cam as indicated previously.

Before dealing with the details of the electrical circuit, there remains to be described only a rubber mill and strain gauge arrangement with which the foregoing recorder is adapted to be used. As shown in Fig. 2, the rubber mill includes end supporting members 73, 74 in which front and rear mill rolls 75, 76 are rotatably mounted, it being understood that a rubber batch is intended to be placed in the upper hollow defined between the two rolls. To permit the gap or nip between the mill rolls to be adjusted, the front roll is mounted in slideable bearing blocks 77, 78, the position of which may be varied by means of adjusting screws 79, 80 threaded through the frame of the mill. Strain gauge capsules 81, 82 fit into recesses in each of the bearing blocks, and the ends of the adjusting screws bear against these capsules. The arrangement is such that separating forces exerted on the mill rolls by a batch of rubber passing through the nip causes stresses and corresponding strains to be transmitted through the bearing blocks and adjusting screws to the mill frame.

As indicated in Fig. 3, each strain gauge capsule comprises an outer hollow cylindrical case 84 containing two spaced disk-like transverse end members 85, 86 which serve to support an internal solid cylindrical mounting member 87, to which two strain gauges 88, 89 are cemented at right angles to each other so that one such strain gauge (89) responds particularly to longitudinal strains (compression) in the mounting cylinder, whereas the other gauge (88) responds particularly to circumferential strains (extension) in the mounting cylinder. The outer end member 85, against which the end of the adjusting screw 79 bears, is slidable within the capsule casing so that strains are readily transmitted from the bearing block and through the inner supporting cylinder to the screw. The strain gauges may be of the well-known type comprising a fine closely wound sensitive resistance wire embedded in a supporting medium and adapted to manifest changes in strain in a surface to which it is attached by reason of proportionate changes in the electrical resistance of the gauge as the winding is compressed or expanded with varying strains. As many such gauges as necessary may be connected together electrically in such manner as to provide a desired output or range of output.

The electrical circuit will now be described.

*Electrical controls and sequence of operation*

Fig. 6 shows the electrical circuit in association with certain of the mechanical parts that have been described in detail above. Although the mechanial parts are designated by the same numerals as employed previously, they are in general shown in more or less exploded relation and depicted much more simply than in the mechanical views. The system is shown in a dormant condition prior to the beginning of a mixing cycle. In operation, the system is initially energized by closing a switch 100 in one of two power supply lines 101, 102 leading from a source of alternating current, thereby activating the two chart tension motors 13, 14 connected to the shafts, respectively, of the chart supply drum 11 and the chart take-up roll 12.

*Chart balancing*

At the same time, closure of the line switch 100 energizes a potentiometer step-down transformer 103, the high voltage or input side of which is connected to the supply lines 101, 102 and the output or low voltage side of which is connected by lines 104, 105 to the resistance element 48 of the rotary slide wire potentiometer 47 associated with the chart balancing assembly. A variable resistance 106 in one such line 104 serves as a range adjustment. A shunt resistance 107 is connected at one end to the terminal of the potentiometer resistance 48 to which one low voltage line 104 is attached. The other end of the shunt resistance 107 is connected to the remaining low voltage line 105 leading from the potentiometer transformer. This shunt resistance serves as a chart zero adjustment, and for this purpose a movable contact thereon is connected by a line 108 to a strain gauge bridge terminal contained between two arms of a strain gauge bridge represented by two resistance elements 88, 89 of one of the strain gauge capsules 81 (Fig. 3) mounted between the mill gap adjusting screw and the mill bearing block as described above.

Closure of the line switch 100 also energizes, through the main supply lines 101, 102, a field winding 109 in the chart balancing servo-motor 17.

The strain gauge bridge is energized by momentarily depressing a normally open control start switch 110. This may be done manually by the mill operator when he commences a milling cycle that it is desired to record. Closure of the control start switch 110 establishes a circuit through a solenoid 111 of a first normally open relay switch, through a line 112 leading from one supply line 101 to one contact of the start switch 110, a line 113 leading from the other contact of the start switch to one side of the solenoid 111, and a line 114 leading from the other side of the solenoid to the other supply line 102. Energizing the solenoid 111 of the first relay switch in this manner closes a first contact arm 115 of the first relay switch and thereby establishes a circuit through a line 116 leading from the line 112 (that is in turn connected to one of the supply lines 101) to the contact arm 115, and thence through a line 117 leading to one input or high voltage terminal of a step-down strain gauge bridge transformer 118. The other input terminal of the strain gauge bridge transformer is connected to a line 119 leading to the other power supply line 102 to complete a circuit through the high voltage winding of the transformer. A line 120 leading from one low voltage or output terminal of the strain gauge bridge transformer leads to a terminal of the bridge located between an arm of the bridge represented by one resistance 88 of one of the strain gauge capsules (81) and another arm of the bridge represented by a resistance 121 of the other strain gauge capsule (82, Fig. 3). A variable resistance 122 connected in the bridge at this terminal serves as a bridge zero adjustment. The other output terminal of the strain gauge bridge transformer is connected by a line 123 to a terminal of the strain gauge bridge located between an arm of the bridge containing one of the resistances 89 of the first strain gauge capsule 81 and a final arm of the bridge containing a last resistance 124 of the remaining strain gauge capsule 82. The arrangement is such that strain gauges 88 and 124 undergo compression and decrease in resistance, while strain gauges 89 and 121 undergo extension and increase in resistance, when the mill roll separating force increases. The respective compression and extension are represented by the small arrows next to the strain gauge resistances in Fig. 6.

The strain gauge bridge is connected, at an output terminal thereof located between the arms of the bridge containing the strain gauge resistances 121 and 124, by means of a line 125, to one input terminal of a servo-amplifier 126. The other input terminal of the servo-amplifier is connected by a line 127 to the rotary wiping arm or slider 55 borne by the chart balancing roll shaft 35 within the slide wire potentiometer 47 and making contact with the resistance 48 of such potentiometer at a position depending on the angular disposition of the chart drum shaft relative to the potentiometer housing.

The output of the servo-amplifier 126 is connected by further lines 128, 129 to a control phase winding 130 of the chart balancing motor 17. It will be understood that the balancing motor is a two phase servo type of motor having two separate windings excited from two different sources. The winding 109, which is excited upon closure of the power switch 100, is known as the line phase, while the other phase is represented by the control winding 130. In accordance with conventional practice, the arrangement is such that the line winding and control winding are excited 90° out of phase with each other. Application of such an out of phase voltage to the control winding causes the servo-motor to turn, and the motor becomes stationary when such voltage is balanced out substantially to zero. As is conventional in such cases, the servo-amplifier 126 may include the usual means, such as a condenser (not shown), for producing the desired out of phase relationship between the line voltage and the control voltage.

The manner in which the foregoing arrangement accomplishes a chart balancing action will now be described. The fundamental purpose of the particular arrangement shown is of course to produce a vertical displacement of the chart 15 (i.e., a rotation of the chart-supporting roll 16) with respect to the recording pen 18 that is proportional to the amount of strain imposed on the strain gauges, and consequently proportional also to the separating forces existing at any given instant between the mill rolls 75, 76. As the pen advances synchronously horizontally across the chart from left to right under the influence of the mechanism provided for this purpose, the pen therefore scribes a horizontal trace 19 (Fig. 5) on the chart that is offset or displaced vertically by an amount indicative of the roll separating forces existent at any moment of time represented by a given horizontal position of the trace.

Assume at the outset that a batch of rubber is being mixed on the mill and the relative position of the wiper arm 55 and the slide wire potentiometer winding 48, and the values of the various resistances of the strain gauge bridge are such that the chart balancing motor is in a stable, balanced condition. Under these conditions the voltage output of the slide wire potentiometer as applied to the conductors 108, 127 is equal to the voltage output of the strain gauge bridge as applied to the conductors 108, 125 with the result that the net voltage applied through the conductors 125, 127 to the servo-amplifier 126 is substantially zero and no power therefore is applied through the conductors 128, 129 leading from the servo-amplifier to the balancing motor control coil 130 and the balancing motor therefore does not rotate. As long as this condition continues to exist, the pen will trace a horizontal line on the chart, that is, there will be no vertical displacement of the chart with respect to the pen. However, assume now that conditions suddenly change on the mill, as by the addition of a quantity of carbon black to the batch of rubber being mixed on the mill so that the batch becomes stiffened. There will then occur a marked increase in the separating force exerted on the mill rolls by the batch. This will be reflected in an increased strain on the strain gauges, resulting in an increase in the value of the strain gauge bridge resistances 89 and 121, which suffer an increment of extension, and a decrease in the value of the resistances 88 and 124 which suffer an increment of compression. The effect of these changes in resistance is to produce a voltage output from the strain gauge bridge as applied to the conductors 108, 125, which now exceeds the output of the slide wire potentiometer (which has not up to the present time changed its former position of balance) as applied to the conductors 108, 127. Therefore a net difference in voltage will be applied through the lines 125, 127 to the servo-amplifier 126 and thence through the lines 128, 129 to the control coil 130 of the balancing motor 17, thereby causing the chart roll 16 and shaft 35 to rotate in a clockwise direction as viewed in Fig. 6. The line traced on the chart will therefore appear to turn upwardly as a consequence of the resulting downward movement of the chart with respect to the pen, indicating the increase in strain or separating force, which was the assumed change.

Since the chart roll shaft 35 thus rotates, while the potentiometer casing 47 remains stationary (the end of the pawl 39 being engaged in one of the notches 38 of the cam 36 secured to the casing), the wiper arm 55 fixed to the shaft will also rotate with respect to the potentiometer resistance 48 fixed to the case. The arrangement is such that the adjustment of resistance thus brought about increases the output of the potentiometer as applied to the lines 108, 127. When the potentiometer output increases to the point where it is equal to the increased bridge output, as applied in an opposite sense to the conductors 108, 125, then the potentiometer output once more cancels out the strain gauge output, and hence flow of power to the servo-amplifier and balancing motor ceases, and the chart becomes stationary once again. In this manner a condition of balance is restored, and such balance is maintained until there is another change in the mill roll separating forces.

If there occurs a decrease instead of an increase in the mill roll separating forces, as by the addition of a plasticizing material to the batch of rubber being milled, a balancing action analogous but opposite to the foregoing balancing action occurs.

Throughout the foregoing described balancing or mill roll pressure recording operations, the first relay switch contact arm 115 is retained in a closed position, to maintain the strain gauge bridge transformer 118 energized, by means of a holding circuit that will now be described. For this purpose an additional normally open contact arm 140 is provided in the first relay switch actuated by the solenoid 111. As previously described, the first solenoid 111 is actuated upon starting a control operation by momentarily depressing the normally open start switch 110. Closure of the contact arm 140 establishes a circuit from the line 113 leading from one side of the solenoid 111 to a line 141 leading through a normally closed stop switch 142 to the line 116 that is in turn connected to one of the main supply lines 101 through the line 112. In this way the solenoid 111 continues to be energized, once the normally open start switch 110 is momentarily actuated, until such time as the described holding circuit is interrupted by actuating the normally closed stop switch 142.

Pen travel control

The first relay solenoid 111 actuates further contacts including a double-throw contact arm 145, which establishes an electrical connection between the line 116 (in turn connected to one power supply line 101 by the line 112) and a line 146 leading to the limit switch 33 located toward the right-hand margin of the chart, which is normally closed and which is adapted to be opened when the pen engages such limit switch after reaching the extreme end of its horizontal travel. A conductor 148 leads from the normally closed limit switch 33 to the pen driving reversible synchronous motor 21. The pen driving motor is also connected to one of the supply lines 102, the arrangement being such that the motor is thus energized for forward rotation, with the result that the pen is translated horizontally at a definite synchronous speed from left to right in the drawing by the mechanism described.

When the pen reaches the extreme right-hand end of its travel, the limit switch 33 is opened, thereby breaking the forward speed circuit through the pen motor. The pen will then remain at the right-hand margin of the chart until an agency momentarily actuates the normally closed stop switch 142. Ordinarily, a given mill mixing operation will require less time than is required for the pen to traverse the whole width of the chart, and therefore when the stop switch 142 is actuated at the conclusion of a mixing cycle the pen will typically not be so far advanced across the chart as to engage the right-hand limit switch. In any case, the action of the stop switch 142 is similar regardless of how far across the chart the pen has advanced. The first solenoid 111 is deenergized when the stop switch 142 is actuated, because the holding circuit through the solenoid 111 is thus interrupted, and as a consequence of such deenergization of the solenoid 111 the contact arm 145 of the first relay returns to its normal position, in which the circuit through the line 146 to the forward pen drive motor circuit is open. At the same time the contacts 140 of the holding circuit for the solenoid 111 return to their normal open position, so that this solenoid will not again be energized until the start switch 110 is again actuated.

As the contact 145 returns to its normal position an electrical connection is made between the line 116 and a line 152 leading to a line 153 connected to a two-way contact 154 of the first limit switch 32, located at the left-hand or starting margin of the chart. Once the pen has been advanced to any extent across the chart the left-hand limit switch 32 assumes such a position that the contact arm 154 thereof establishes an electrical connection between the line 153 and a conductor 155 leading to the reverse rotation circuit of the pen drive motor. Hence, the ultimate result of actuating the stop switch 142 is to cause the pen drive motor to reverse its direction of travel. As the pen returns to its starting position and engages the left-hand limit switch 32, the circuit through the reverse portion of the pen motor is broken, and the contact 154 instead connects the line 153 to a line 156 leading to a contact arm 157 of a second relay switch operated by a solenoid 158 as part of a chart advance system which will now be described.

Chart advance

The purpose of the chart advancing arrangement is to displace the chart vertically by a substantial increment at the conclusion of one milling cycle in order to bring a new portion of the chart into engagement with the pen so that the next succeeding mixing cycle will be recorded on the chart as a discrete trace spaced vertically from the preceding record. Establishment of the first of a series of several necessary conditions for chart advance is initiated with the original closing of the start switch 110, whereupon the first solenoid 111 closes a normally open contact arm 160 of the first relay switch. This establishes a connection from the line 116 to a line 161 leading to the solenoid 158 of the second relay switch. A line 162 from the power line 102 to the other end of the second solenoid 158 completes a circuit therethrough.

A holding circuit for the second solenoid 158 is established when such solenoid causes a normally open contact arm 163 of the second relay switch to close, allowing current to flow through the solenoid 158 to a line 165 leading to a contact 166 of the micro switch 45 disposed below the rear arm of the pawl 39. A two-way contact arm 167 of such micro switch is normally in engagement with the contact 166 and serves to establish a connection with a line 168 leading to the remaining power line 101. In this way, the second solenoid 158 remains energized even when the stop switch 142 is actuated and the contact arm 160 in the first relay switch is thus opened.

Another necessary preliminary to chart advance is established when the second relay solenoid 158 (actuated initially by the stop switch 110 as described) closes a contact arm 170 of the second relay switch, thereby connecting lines 152 and 153 to a line 171 extending to the cam-advancing motor 64. The remaining terminal of the cam-advancing motor is connected by a line 173 to one of the power supply lines 102. The cam-advancing motor is thereby energized because contacts 170 are connected, through line 152, contact 145 and lines 116, 112, to the remaining power supply line 101, it being assumed that the stop switch 142 has been actauted, thereby deenergizing the first solenoid 111 and permitting the contact arm 145 to return to its normal position. Rotation of the cam-advancing motor 64 causes the sliding cam-driving gear 62 to slip on the cam without rotating the cam or the potentiometer case as long as the pawl 39 is engaged with a notch 38 of the cam.

Before any actual advance of the chart takes place, the pen is returned to the left-hand or zero-time margin of the chart. Return of the pen is occasioned by actuation of the stop switch 142, which influences the pen travel control system, as described above, in such manner that the reserve circuit of the pen drive motor 21 is energized through the line 155, and the contact arm 154 of the left-hand limit switch 32, and thence through the line 153 leading to the line 152 through the contact arm 145 of the first relay switch into the lines 116 and 112 connected to one of the power lines 101. During its return travel the pen describes initially a downwardly slanting trace 174 (Fig. 5) on the chart as a consequence of the fact that actuation of the stop switch 142 opens one of the power supply lines (117) to the strain gauge bridge transformer 118, because the contact arm 115 in the first relay switch is opened. Because the strain gauge bridge transformer is thus deenergized, the strain gauge bridge produces no output voltage in the output lines 108, 125. Hence, the voltage output of the potentiometer circuit, as applied to the lines 108, 125, is now unopposed by any voltage from the strain gauge bridge, and the field circuit 130 of the chart balancing motor thereby causes the motor to rotate in a counterclockwise direction (as viewed in Fig. 6) as the pen starts to return, thus producing the downwardly slanting line 174 shown in Fig. 5. This counterclockwise rotation of the chart balancing motor continues until the chart balancing roll shaft 35 and the wiper arm 55 in the potentiometer casing assume such a position that the potentiometer output applied to the lines 108, 127 is essentially zero, whereupon the chart balancing motor ceases to rotate and the chart roll, the chart roll shaft and the chart itself all assume a stationary, balanced condition. Continued return travel of the pen now produces merely a straignht horizontal line 175 (Fig. 5) which constitues a line of reference or a base line, representing zero strain or mill roll separating force (i.e., the balanced position with no strain gauge bridge output). Elevations or vertical distances of the main record line 19 above the horizontal zero line 175 are proportional to the magnitude of the mill roll separating force existing at any particular instant of time.

The actual advance of the chart into position for the next record does not take place until after the pen has returned to the left-hand margin. When the pen returns to such starting position, the contact arm 154 of the left-hand limit switch breaks contact as indicated above with the line 156 in the reverse circuit of the pen motor 21, thereby causing such motor to stop, and makes contact with the line 156 leading through the contact arm 157 of the second relay switch to a line 176 connected to one terminal of the pawl-actuating solenoid 43. When the pawl-actuating solenoid 43 is thus energized the rear portion 44 of the pawl is pulled downwardly, thereby rotating the pawl 39 about the pivotal connection 40, and raising the forward end 41 of the pawl from a notch 38 of the cam 36. It will be recalled that the cam-advancing motor 64 has previously been energized, causing the cam-advancing sliding gear 62 to rotate with respect to the chart-driving shaft 35, such gear being prevented from actually rotating the cam and potentiometer case previous to this time because of the engagement of the pawl with the cam notch. However, as soon as the pawl is lifted out of the cam notch, the frictional engagement of the cam-driving gear 62 and the cam, by reason of the frictional members 67, 68 (Fig. 4) disposed therebetween is sufficient to cause the gear to produce rotation of the cam and potentiometer casing with respect to the chart drive shaft 35 in a clockwise direction as viewed in Fig. 6. This rotation of the potentiometer case is enabled to get underway immediately without any appreciable delay because the cam-driving motor 64 has previously been started, as well as the gearing connected thereto, and there is therefore very little inertia in the system.

As soon as the rear portion of the pawl is pulled downwardly the micro-switch 45 mounted thereunder is actuated in such manner that its contact arm 167 moves away from the contact 166 of the micro-switch to which is attached the line 165 in the holding circuit of the second relay solenoid 158. The circuit through the contact 163 of the second relay switch, the second solenoid 158, and the line 162 to the power line 102 is thus broken, causing all of the contacts 163, 157 and 170 of the second relay switch to open. One effect of this is to deenergize the pawl actuating solenoid 43, whereupon the forward end 41 of the pawl falls against the cam. However the end of the pawl does not at this time fall into a notch 38 of the cam, because rotation of the cam has meanwhile been initiated quickly as described, and therefore the end of the pawl falls instead against the peripheral face 37 of the cam and simply slides or drags thereon without interference at this time with further rotation of the cam under the influence of the cam-advancing motor. It will be seen that the action of the foregoing arrangement is such that the pawl has been lifted from the cam only momentarily, for a time just sufficient to permit the quickly acting cam-advancing motor to move the notch out of the way of the pawl end, whereupon the pawl immediately drops into contact with the cam again.

The action of the cam-advancing motor is not interrupted by the lowering of the rear end of the pawl, even though the micro-switch 45 causes all the contacts of the switch operated by the second solenoid 158 to open (including the contact 170 through which the cam-advancing motor had been energized up to this point) because the micro-switch is provided with a contact 179 and is energized by the arm 167 of the switch when the rear end of the pawl is depressed sufficiently to raise the front end of the pawl from the cam notch. The contact 179 of the micro-switch is connected to a line 180 leading to the cam-actuating motor, so that such motor is energized because a circuit is completed from one of the power supply lines 101 to the line 168, through the contact arm 167 and contact 179 of the micro-switch, to the line 180 and into the cam-actuating motor, and thence through the line 173 to the remaining power supply line 102. The arm 167 of the micro-switch 45 remains in engagement with the contact 179 therein until the forward end of the cam drops once again into one of the notches 38 of the cam, whereupon the circuit through the cam-actuating motor is broken and the cam ceases to rotate, not only because the cam-actuating motor is deenergized but also because engagement of the pawl end 41 in the cam notch precludes any further rotation of the cam or potentiometer case. Because the notches of the cam are spaced apart 90° or ¼ of a revolution, it will be apparent that rotation of the cam and potentiometer case as a consequence of this arrangement continues for ¼ of a revolution or 90°, and then ceases.

The thus-produced 90° rotation of the cam and potentiometer case with respect to the chart driving shaft 35, with accompanying change in the position of the wiper arm 55 attached to the shaft 35 with respect to the potentiometer winding 48, produces a corresponding imbalance in the circuit of the chart balancing motor, which was formerly in balance at a position indicative of zero strain, as described. There is thus applied to the control phase winding 130 of the chart balancing motor, a potentiometer output voltage which causes the chart balancing motor to rotate the chart drum and chart roll shaft 35 in a clockwise direction by an amount sufficient to restore the former condition of balance. One quarter of a revolution, or 90° rotation, effects this result by bringing the potentiometer winding and the wiper arm back to their original relative positions. There is thus produced while the pen is at the left-hand margin of the chart a downward movement of the chart, so that the pen instead of contacting the chart at a point 181 (Fig. 5), now contacts the chart at a position 182 displaced above such point by a predetermined discrete amount corresponding to the movement of the chart occasioned by the 90° rotation of the chart balancing roll. The pen at position 182 is now ready to commence a new record as indicated by the dotted line 183, when the starting switch 110 is again actuated at the commencement of the next subsequent batch.

In the two typical records of two successive batches illustrated in Fig. 5, the lettered points on the graphs correspond to the following operations:

A. Breakdown of rubber. Stock formed a band on the front roll. No cutting or blending took place.

B. Stock sticking to back roll. Operator cut off stock and dropped it in pan positioned below the mill rolls.

C. Cutting and blending of the stock by the operator.

D. Cutting and blending become difficult as stock becomes tacky.

E. Mixed stock is slabbed off the mill at the conclusion of the mixing.

The numbered points on the graphs correspond to the following additions:

(1) Rubber-carbon black masterbatch, and accelerator.

(2) Magnesium oxide and sodium acetate.

(3) Anti-oxidant, whiting, carbon black, petrolatum and oil.

(4) Stearic acid.

(5) Zinc oxide.

From the foregoing it will be evident that the embodiment of the invention described in detail provides a series of successive records longitudinally spaced on a record chart in such manner that any batch or group of batches in a series is directly comparable to any other batch or batches or to a desired standard. Since the records start from a common longitudinal margin, any longitudinal line on the chart represents the condition of every batch at the same elapsed time, and therefore the condition of the process at corresponding times in every batch is immediately evident and directly comparable. Total elapsed time for every batch is also revealed.

The combination of rubber mill and recorder as described makes it possible to record and preserve valuable information about the milling operation in a very useful form. Displacements of the record line from a transverse base or zero line in the embodiment of the invention described reveal particularly the degree of breakdown or viscosity of the rubber stock, and variations in the record line indicate permanently a variety of happenings that could not be discerned from previously known recording arrangements.

Having thus described our invention, what we claim and desire to protect by Letters Patent is:

1. A recording instrument comprising in combination a chart supporting roll, a balancing network, a balancing motor coupled to said network for rotating said chart supporting roll by an amount proportional to a variable that it is desired to record continuously, a marking device supported in proximity to the surface of a chart mounted on the roll for producing a mark on the chart in accordance with the relative position of the chart and marking device, means for translating said marking device synchronously across the chart from a starting margin to provide a continuous record of changes in said relative position and said variable with time, reversing means for returning the marking device to said starting margin, reverse actuating means located at the margin of the chart opposite to said starting margin adapted to be contacted by the marking device upon reaching said opposite margin, said reverse actuating means being connected to said reversing means for actuating the same upon the occurrence of said contact, and means for establishing an imbalance in the said balancing network by a predetermined amount upon return of the marking device whereby said balancing motor rotates said chart supporting roll to correct said imbalance and thereby present a fresh area of chart for a subseqeunt record.

2. A recording instrument for continuously recording the relative magnitude of a variable quantity during each of a series of repeated batch processes comprising a record chart supporting roll, a servo-motor attached to said roll for varying the angular displacement thereof, an electrical circuit for actuating said servo-motor including means for varying a voltage in said circuit in response to variations in the said variable quantity that it is desired to record, a potentiometer in said circuit adapted to be actuated by said servo-motor upon occurrence of said variations in voltage in such a direction as to cancel out said variations in voltage whereby the servo-motor upon occurrence of said variations changes the angular displacement of the chart supporting roll in a direction such as to bring the servo-motor into a condition of electrical balance, a stylus mounted in proximity to a chart supported on said roll, means for translating said stylus sychronously axially of said roll to scribe a trace transversely of the chart and thereby record said variations on the chart, starting means operable upon initiation of one of said batch processes for energizing said circuit and starting the said stylus driving means, means operable upon completion of said one batch process for reversing said stylus driving means to return the stylus to a starting position, and means operable upon completion of said batch for producing a predetermined change in said potentiometer to create an imbalance in said servo-motor circuit and thereby actuate said servo-motor to correct said imbalance, whereby the chart supporting roll is angularly displaced by a predetermined amount and the chart supported thereon is moved such amount to present a fresh portion of chart for recording a next succeeding batch in said series.

3. A recording instrument for recording the relative magnitude of a variable quantity during a series of repeated batch operations comprising in combination a roll on which a chart is adapted to be supported, a pen mounted in proximity to said chart for plotting a line thereon in accordance with the relative position of the chart and pen, a servo-motor connected to said roll for rotating said roll and thereby displacing the chart with respect to said pen in accordance with changes in the variable quantity being measured, an electrical circuit for actuating said servo-motor comprising a control winding in said motor, a first voltage input connected to said control winding, means for varying said first voltage input in accordance with changes in the said variable quantity being measured, a second voltage input connected to said control winding in series with said first voltage input in such manner as to oppose said first voltage input, a rotary potentiometer in series with said second voltage input and said control winding, said rotary potentiometer being mechanically coupled to said servo-motor for varying said second voltage input in such a direction as to cancel out the said first voltage input whereby the servo-motor is brought into a condition of balance, and means operative between successive batch operations for producing a definite predetermined rotation of said potentiometer whereby the servo-motor is temporarily unbalanced and the servo-motor rotates an amount sufficient to restore a condition of balance, such rotation of the servo-motor serving to advance the roll and chart thereon to provide a fresh portion of chart for recording the next succeeding batch operation.

4. A recorder as in claim 3 in which the said means for producing a definite predetermined rotation of the potentiometer comprises a cam-advancing motor connected to said potentiometer, a cam attached to the potentiometer for controlling the rotation of the potentiometer, said cam having peripheral spaced notches, a pawl pivotally mounted in proximity to said cam and disposed normally in interlocking engagement with one of said notches to prevent rotation of the cam and potentiometer, and means operative between successive cycles for temporarily disengaging said pawl from said cam whereby said cam-advancing motor is enabled to produce said definite predetermined rotation of the potentiometer.

5. A combination as in claim 4 in which the cam-advancing motor is connected to the cam through a cam-advancing gear rotatably mounted on said cam, and said cam-advancing motor is connected to means for starting said cam-advancing motor at the conclusion of an operating cycle and before disengaging said pawl, thereby causing said motor to rotate said cam-advancing gear with respect to the cam, said combination including a frictional engagement means between said cam and cam-advancing gear whereby said gear produces rotation of the cam when the said pawl is disengaged.

6. The combination of a rubber mill, a strain gauge assembly mounted on said rubber mill in such manner as to vary in resistance in response to variations in separating force exerted on the mill rolls, a recorder having an electrical circuit connected to said strain gauge assembly, said recorder comprising a record chart supporting roll, a servo-motor in said electrical circuit attached to said roll for varying the angular displacement of said roll in response to changes in voltage in said circuit occasioned by variations in said mill roll separating force, a potentiometer in said circuit adapted to be actuated by said servo-motor upon occurrence of said variations in voltage in such a direction as to cancel out said variations in voltage whereby the servo-motor upon occurrence of said variations changes the angular displacement of the chart supporting roll in a direction such as to bring the servo-motor into a condition of electrical balance, a stylus mounted in proximity to a chart supported on said chart supporting roll, means for translating said stylus synchronously axially of said chart supporting roll to scribe a trace transversely of the chart and thereby record said variations on the chart, starting means operable upon initiation of a milling and recording operation for energizing said circuit and starting the said stylus driving means, means operable upon completion of said milling and recording operation for reversing said stylus driving means to return the stylus to a starting position, further means operable upon completion of said milling and recording operation for producing a definite predetermined rotation of said potentiometer whereby the servo-motor is temporarily unbalanced and the servo-motor rotates an amount sufficient to restore a condition of balance, such rotation of the servo-motor serving to advance the chart supporting roll and chart thereon to provide a fresh portion of chart for a next succeeding milling and recording operation, the said means for producing a definite predetermined rotation of the potentiometer being comprised of a cam-advancing motor connected to said potentiometer through a cam-advancing gear, said cam-advancing gear being rotatably mounted on a cam attached to the potentiometer for controlling the rotation of the potentiometer, a frictional engagement means disposed between the cam and the cam-advancing gear to cause said cam and gear to rotate as a unit when the gear is rotated provided the cam is free to rotate, said cam having peripheral spaced notches, a pawl pivotally mounted in proximity to said cam and disposed normally in interlocking engagement with one of said notches to prevent rotation of the cam and potentiometer, means operative between successive cycles for temporarily disengaging said pawl from said cam, and means connected to said cam-advancing motor for starting said motor at the conclusion of a milling and recording operation and before disengaging said pawl, whereby said cam-advancing motor is enabled to produce said definite predetermined rotation of the potentiometer.

7. An instrument for providing a permanent graphical record of a variable quantity in a process as a function of time in a series of repetitions of the process, comprising a chart of indefinite length having a time coordinate extending transversely thereof and a coordinate for said variable quantity extending longitudinally thereof; means for supporting said chart; a stylus mounted for operative engagement with said chart; means for effecting relative displacement of said chart with respect to said stylus longitudinally of said chart by an amount proportional to said variable quantity continuously during each repetition of said process; means for translating said stylus transversely across said chart from a starting margin at a constant speed, independent of said variable quantity, during each such repetition; means for returning said stylus transversely to said starting margin, and for simultaneously adjusting the relative longitudinal position of said chart with respect to said stylus to correspond to the value zero of said variable quantity during the preceding repetition, at the end of each such repetition; and means for advancing said chart longitudinally by a predetermined amount after said stylus has thus returned to said starting margin, to provide a fresh adjacent area of chart for the recording of said variable quantity during the next repetition of said process; whereby successive repetitions are recorded in a manner that makes the record of each repetition distinct from and readily comparable with the records of preceding and succeeding repetitions.

8. An instrument for providing a permanent record of a series of sequential rubber milling operations performed on a roll mill, comprising means for continuously measuring the roll-separating force exerted by the rubber and compounding ingredients introduced between said rolls of said mill, a chart on which to record said separating force, means for supporting said chart, a stylus mounted for operative engagement with said chart, means including a balancing motor operatively interconnecting said force measuring means and said chart supporting means for longitudinally and continuously moving said chart relative to said stylus during each milling operation by an amount proportional to said roll-separating force, means for translating said stylus from a starting position transversely of said chart at a constant speed independent of said separating force to provide a plot of changes in the separating force with time during each milling operation, means for returning said stylus transversely to said starting position and for simultaneously adjusting the relative longitudinal position of said chart with respect to said stylus to correspond to the value zero of said separating force during the preceding operation, after termination of each milling operation, and means for advancing said chart longitudinally by a predetermined amount after each such return of said stylus to said starting position to provide a fresh area of said chart for the next succeeding milling operation.

9. The combination of a rubber mill, means mounted on the mill for measuring changes in the separating force between the mill rolls, and an instrument as claimed in claim 7 operatively interconnected with said measuring means for recording said changes in the said separating force.

References Cited in the file of this patent

UNITED STATES PATENTS

| | | |
|---|---|---|
| 1,352,150 | Schneider | Sept. 7, 1920 |
| 1,926,640 | Weston | Sept. 12, 1933 |
| 2,051,780 | Brown | Aug. 18, 1936 |
| 2,229,069 | Geyger | Jan. 21, 1941 |
| 2,233,285 | Gilbert et al. | Feb. 25, 1941 |
| 2,424,856 | Schnuck | July 29, 1947 |
| 2,684,473 | Shannon | July 20, 1954 |

FOREIGN PATENTS

| | | |
|---|---|---|
| 749,327 | Germany | Jan. 13, 1945 |